United States Patent [19]

Nishizawa

[11] Patent Number: 5,279,227

[45] Date of Patent: Jan. 18, 1994

[54] GAS GENERATOR

[75] Inventor: Muneo Nishizawa, Shiga, Japan

[73] Assignee: Takata Corporation, Tokyo, Japan

[21] Appl. No.: 980,167

[22] Filed: Nov. 23, 1992

[30] Foreign Application Priority Data

Dec. 5, 1991 [JP] Japan .................................. 3-321857

[51] Int. Cl.[5] .................................................. C06D 5/00
[52] U.S. Cl. .................................... 102/274; 89/1.14; 102/530
[58] Field of Search ........... 102/272, 274, 275, 275.11, 102/204, 530, 531, 429; 89/1.14

[56] References Cited

U.S. PATENT DOCUMENTS

| | | | |
|---|---|---|---|
| 2,375,522 | 5/1945 | Campbell | 102/274 |
| 3,254,602 | 6/1966 | Klostermann et al. | 102/429 |
| 3,611,941 | 10/1971 | Hopmeier | 102/272 |
| 3,727,575 | 4/1973 | Prachar | 102/272 |

*Primary Examiner*—David H. Brown
*Attorney, Agent, or Firm*—Kanesaka and Takeuchi

[57] ABSTRACT

A mechanical ignition type gas generator ignited by a striker comprises a gunpowder holder incorporating a gunpowder, a striker caused to dash against the gunpowder in the gunpowder holder, a striker holding member having a striker guide aperture in which the striker is inserted, a main spring for resiliently biasing the striker in the detaching direction, a trigger for retaining the striker, and a balancer for releasing the retainment of the trigger. A tapered portion that diametrically enlarges toward the gunpowder holder is disposed in the inner circumferential surface of the striker guide aperture of the striker holding member. A gas leak inhibiting ring is apart from the outer circumferential surface of the striker during non-ignition state of the gunpowder. The ring is urged to the tapered portion under the pressure of a gas from the gunpowder and deformed and brought into an intimate contact with the outer circumferential surface of the striker upon ignition of the gunpowder, thereby preventing the leakage of the gas from the striker guide aperture.

9 Claims, 4 Drawing Sheets

GAS GENERATOR

FIELD OF THE INVENTION

The present invention relates to a gas generator for use in an air bag device or a seat belt retractor device disposed in a vehicle or the like for protecting an occupant. More in particular, the present invention relates to a striker-ignition type gas generator adapted to ignite a gunpowder by a striker.

DESCRIPTION OF THE RELATED ART

When a vehicle in which an air bag device is mounted encounters collision, a gas generator of the air bag device actuates to generate a gas which can rapidly extend the air bag.

When a vehicle in which a seat belt retractor device having a striker-ignition type gas generator is mounted encounters collision, the retractor device locks a seat belt due to the gas released from a gas generator thereby constraining an occupant onto the seat.

Description will be made to an existent example of the gas generator of this type with reference FIGS. 2 and 3.

In FIG. 2, a gunpowder 12 is charged in a cylindrical casing 10. A cap 14 is attached to the casing 10 and a striker 18 is inserted in a hole 16 disposed to the cap 14. A stub primer (ignition gunpowder) 12a is disposed to the gunpowder 12 on the side of the striker 18. The striker 18 is caused to dash against the stub primer 12a when the acceleration sensing device 20 detects acceleration greater than a predetermined level.

The acceleration sensing device 20 comprises a sensor housing 22 connected with the casing 10, a trigger 26 rotatably supported by a pin 24 in the sensor housing 22 and a main spring 32 for resiliently biasing the striker 18 in the dashing direction. A flange 34 is disposed at the midway of the striker 18 and the main spring 32 abuts against the flange 34. The trigger 26 is resiliently biased by a trigger spring 36 in the direction engaging the flange 34. 38 denotes an aperture formed in the sensor housing 22 through which the striker 18 is inserted and passed.

A cylinder 42 is attached by way of a block 40 to the casing 10. A piston 44 is slidably inserted into the cylinder 42. The piston 44 is connected by way of wire 46 to a locking mechanism of a seat belt retractor.

When a vehicle in which a seat belt retractor having the gas generator constituted as described above is mounted encounters collision, the balancer 30 swings to bias the trigger 26 in the direction of the trigger spring 36 as shown in FIG. 3 and the trigger 26 disengages from the flange 34. Thus, the striker 18 dashes toward the stub primer 12a under the urging force of the main spring 32 to ignite the stub primer 12a which, in turn, ignites the gunpowder 12. A gas generated by the ignition of the gunpowder rapidly moves the piston 44 so that the locking mechanism of the seat belt retractor is actuated by way of the wire 46.

In the above-mentioned existent embodiment, the gas generator is applied to the seat belt retractor. In a case when the gas generator is applied to an air bag device, the gas generated by the ignition of the gunpowder 12 is jetted out in the air bag device to rapidly extend the air bag.

A required gap is formed between the inner circumferential surface of each of the apertures 16 and 38 and the outer circumferential surface of the striker 18 so as not to decrease the speed of the striker 18 when it is caused to dash against the stub primer 12a.

In the existent gas generator described above, there has been a problem that a gas generated upon ignition of the gunpowder 12 partially leaks by passing through the gap between the outer circumferential surface of the striker 18 and the inner circumferential surface of each of the apertures 16 and 38.

OBJECT AND SUMMARY OF THE INVENTION

An object of the present invention is to provide a gas generator for preventing leakage of a gas through a gap between a striker guide aperture and a striker.

A gas generator in the first aspect of the present invention is a mechanical ignition type gas generator comprising a gunpowder holder incorporating a gunpowder, a striker caused to dash against the gunpowder in the gunpowder holder, a striker holding member secured to the gunpowder holder and having a striker guide aperture in which the striker is inserted, a main spring for resiliently biasing the striker in a dashing direction, a trigger for retaining the striker and a balancer for releasing the trigger wherein a tapered portion that diametrically enlarges toward the gunpowder holder is disposed to the inner circumferential surface of the striker guide aperture of the striker holding member, and a gas leak inhibiting ring is fitted in the tapered portion. The ring is apart from the outer circumferential surface of the striker during non-ignition state of the gunpowder and urged to the tapered portion under the pressure of a gas from the gunpowder and deformed and brought into an intimate contact with the outer circumferential surface of the striker upon ignition of the gunpowder, thereby preventing the leakage of the gas through the striker guide aperture.

In the second aspect of the gas generator as defined in the first aspect, a straight aperture of an equal diameter is disposed in the striker guide aperture on the side nearer to the gunpowder holder than the tapered portion and the gas leak inhibiting ring is disposed also to the straight aperture.

In the third aspect of the gas generator as defined in the second aspect, a first gas leak preventing ring is disposed to the tapered portion and a second gas leak inhibiting ring separate from the first gas leak inhibiting ring is disposed to the straight aperture.

In the fourth aspect of the gas generator as defined in the second aspect, an integral gas leak inhibiting ring is disposed from the tapered portion to the straight aperture.

In the gas generator according to the present invention, predetermined gaps are formed between the inner circumferential surface for the striker guide aperture and and the outer circumferential surface of the striker, and between the inner circumferential surface of the gas leak inhibiting ring and the outer circumferential surface of the striker during non-ignition state of the gunpowder, and the striker undergoes almost no frictional force from the inner circumferential surface when the striker is caused to dash against the stub primer, so that the striker dashes against the stub primer at a high speed. When the gunpowder is ignited to generate a gas, the gas leak inhibiting ring is urged to the inner circumferential surface of the tapered aperture due to the gas pressure and, further, the gas leak inhibiting ring is urged also to the outer circumferential surface of the striker. As a result, the gas is inhibited from leakage through the gap between the outer circumferential surface of the striker and the inner circumferential surface of the striker guide aperture.

In the gas generator defined with the second aspect, the gas leak inhibiting ring is disposed also to the straight aperture portion, and the length of the gas leak inhibiting ring in the longitudinal direction of the striker is large. Accordingly, it can provide a high gas leak inhibiting function.

In the gas generator defined with the third aspect, the pressure of the gas from the gunpowder at first urges the second gas leak inhibiting ring and then the second gas leak inhibiting ring urges the first gas leak inhibiting ring, so that the first gas leak inhibiting ring is urged to the inner circumferential surface of the tapered portion and, subsequently, urged to the outer circumferential surface of the striker. Also in the gas generator with the third aspect, leakage of the gas can be prevented reliably.

In the gas generator defined with the fourth aspect, the integral gas inhibiting ring is directly urged to the inner circumferential surface of the tapered portion under the pressure of the gas from the gunpowder, and, subsequently, brought into an intimate contact with the outer circumferential surface of the striker. The leakage of the gas can be prevented reliably also by the gas generator of the fourth aspect.

PREFERRED EMBODIMENTS

Description will now be made to preferred embodiments with reference to the drawings.

Figure 1:
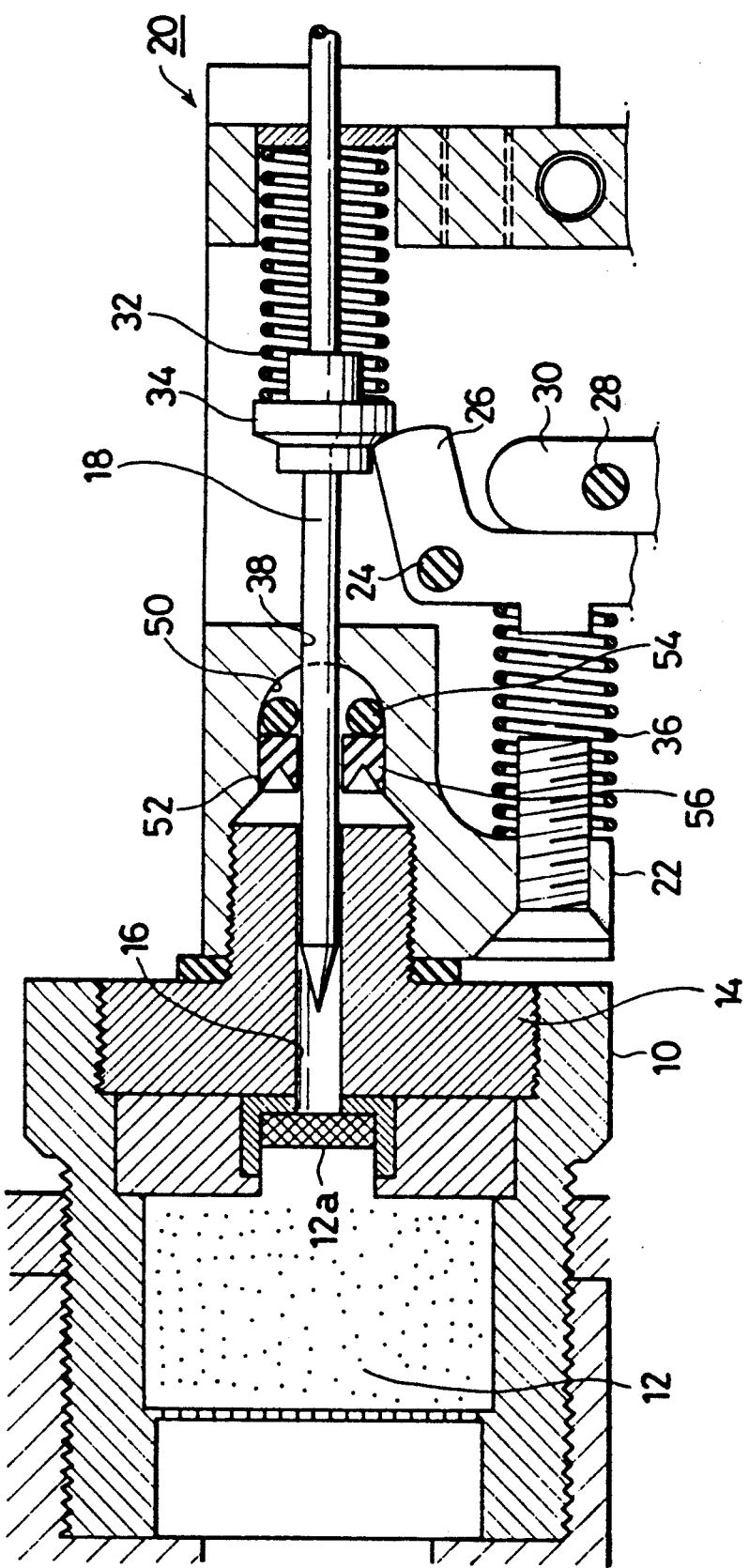
FIG. 1 us a cross sectional view for a portion of a gas generator in a preferred embodiment according to the present invention.

FIG. 1 is an enlarged cross sectional view for a portion of a gas generator of a preferred embodiment according to the present invention. In this embodiment, a tapered portion 50 diametrically enlarging toward a casing 10 is disposed to the inner circumferential surface of an aperture 38 in a senser housing 22, and a straight aperture 52 of an equal diameter is disposed on the side nearer to the casing 10 than the tapered portion 50. Then, an O-ring 54 is inserted into the tapered portion 50 and a V-packing 56 is inserted in the straight aperture 52. A striker 18 is disposed so as to penetrate the O-ring 54 and the V-packing 56. Before ignition of a gunpowder 12, the inner diameters of the O-ring 54 and the V-packing 56 are greater than the outer diameter of the striker 18.

Figure 2:
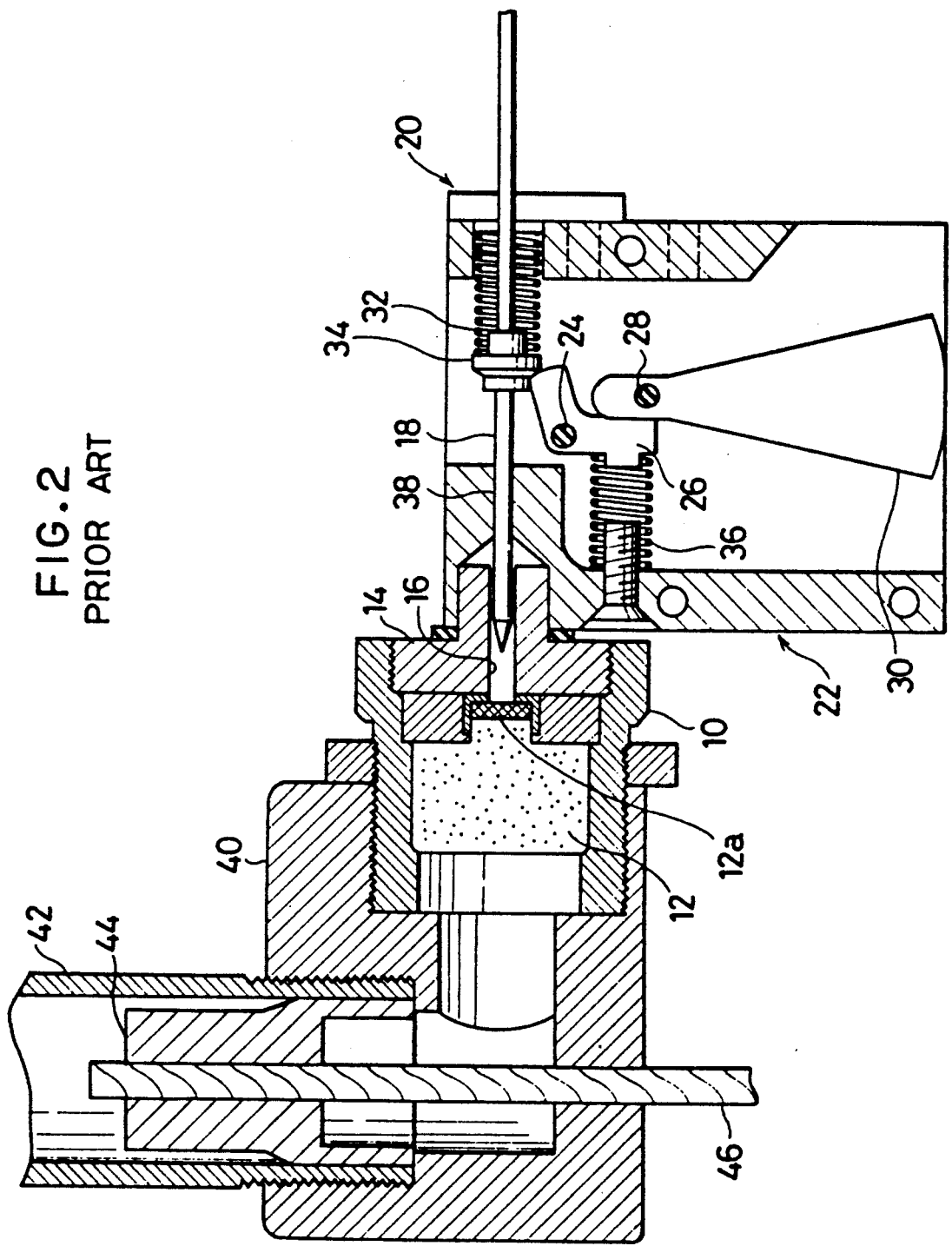
FIG. 2 is a cross sectional view of an existent gas generator in the prior art.
Figure 3:
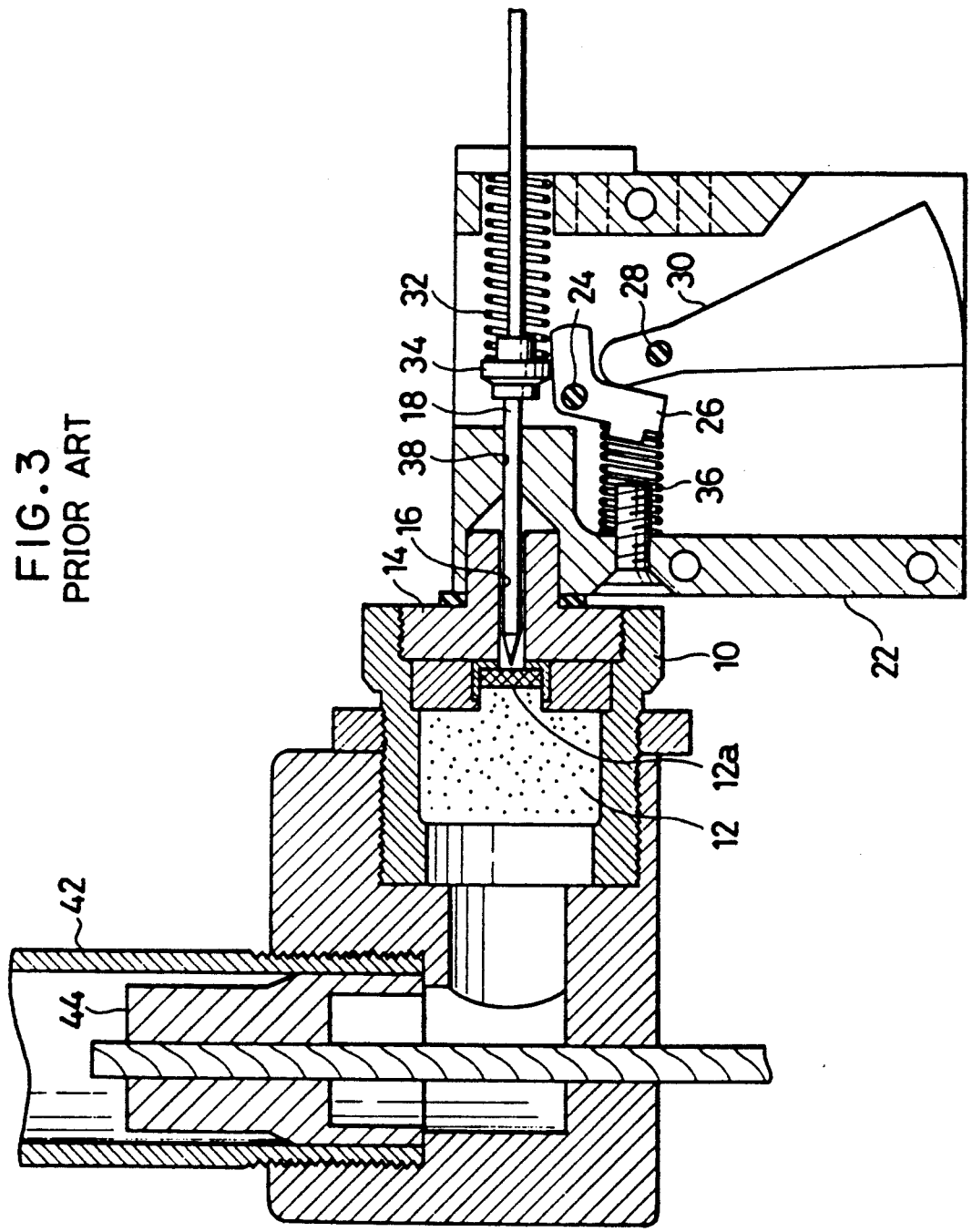
FIG. 3 is a cross sectional view illustrating the operation of the existent gas generator.
Figure 4:
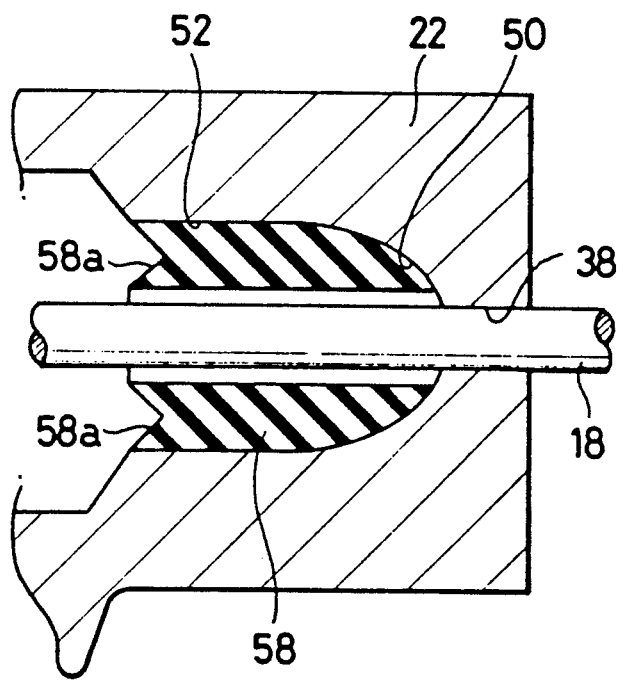
FIG. 4 is a cross sectional view for a portion of a gas generator in another embodiment of the present invention.

Other structures in FIG. 1 are the same as those in FIG. 2 and identical portions carry the same reference numerals for which duplicate descriptions will be omitted.

In the gas generator having thus been constituted, when a trigger 26 detaches from a flange 34, and the striker 18 dashes against the gunpowder 12 to generate a gas from the gunpowder 12, the gas tends to leak through a gap between the outer circumferential surface of the striker 18 and the inner circumferential surface of the aperture 16. By the way, the gas pressure urges the V-packing 56 and, further, the V-packing 56 urges the O-ring 54 to the tapered portion 50. As a result, the O-ring 54 reduces its diameter and the O-ring 54 is brought into an intimate contact with the outer circumferential surface of the striker 18. The V-packing 56 itself is also brought into an intimate contact with the straight aperture 52 and the striker 18. Accordingly, the gas from the gunpowder 12 can be prevented from leaking to the side of the acceleration sensing device 20, and the entire amount of the gas released from the gunpowder can be utilized for the operation of the seat belt retractor or the air bag device.

Further, the inner diameter of the O-ring 54 and the inner diameter of the V-packing 56 are set, respectively, to slightly greater than the diameter of the striker 18. Therefore, the striker 18 dashes at a high speed without undergoing the frictional resistance from the O-ring 54 and the V-packing 56 until the striker 18 sticks into the stub primer.

In this embodiment, the O-ring 54 and the V-packing 56 are used. However, in the present invention, an integral ring-shaped packing 58 may be used from the tapered portion 50 to the straight aperture 52. The inner diameter of the packing 58 is made slightly greater than the diameter of the striker 18, so that the dashing speed of the striker 18 is not decreased. When the pressure of the gas from the gunpowder is exerted on the packing 58, the packing 58 is urged to the tapered portion 50 and then brought into an intimate contact with the outer circumferential surface of the striker 18 to prevent the gas from leakage. A V-shaped groove 58a is disposed circumferentially at the front surface of the packing 58 so as to receive the gas pressure and reduce the diameter of the packing 58 easily.

In this embodiment, the tapered portion 50 and the straight aperture 52 are disposed, but only the tapered portion 50 may be disposed in the present invention. If the straight aperture 52 is disposed as shown in the drawing, the packing can be present over the long range in the longitudinal direction of the striker 18, thereby enabling to prevent the gas leakage reliably.

As has been described above in the gas generator according to the present invention, the gas from the gunpowder does not leak through the gap between the striker guide aperture and the striker, and the entire amount of the pressure of the released gas can be utilized to an aimed operation such as for the seat belt retractor or the air bag device. Further, in the gas generator according to the present invention, when the striker dashes against the stub primer, the striker undergoes almost no friction from the gas leak inhibiting ring and the dashing speed of the striker is high.

What is claimed is:

1. A gas generator ignited by a striker comprising:
   a gunpowder holder incorporating a gunpowder,
   a striker caused to dash against the gunpowder in said gunpowder holder,
   a striker holding member having a striker guide aperture in which said striker is inserted,
   a main spring for resiliently biasing said striker in a detaching direction,
   a trigger detachably engaging the striker for retaining said striker biased by the main spring,
   a balancer for releasing said trigger and
   means for preventing leakage of a gas through said striker guide aperture.

2. A gas generator as defined in claim 1, wherein a tapered portion that diametrically enlarges toward the gunpowder holder is disposed in the inner circumferential surface of the striker guide aperture of the striker holding member as the gas leak preventing means, and a gas leak inhibiting ring that is apart from an outer circumferential surface of the striker during non-ignition state of the gunpowder, urged to said tapered portion under a pressure of a gas from the gunpowder and deformed and brought into an intimate contact with the outer circumferential surface of said striker upon ignition of said gunpowder, thereby preventing the leakage of the gas from the striker guide aperture is fitted in said tapered portion.

3. A gas generator as defined in claim 2, wherein a straight hole portion of an equal diameter is disposed as the striker guide aperture on a side nearer to the gunpowder holder than the tapered portion, and said gas leak inhibiting ring is disposed also in said straight hole portion.

4. A gas generator as defined in claim 3, wherein said gas leak inhibiting ring is formed of a first gas leak inhibiting ring disposed to the tapered portion and a second gas leak inhibiting ring separate from said first gas leak inhibiting ring and disposed to the straight hole portion.

5. A gas generator as defined in claim 4, wherein the second gas leak inhibiting ring comprises a V-packing.

6. A gas generator as defined in claim 3, wherein said gas leak inhibiting ring extends from the tapered portion to the straight hole portion.

7. A gas generator as defined in claim 6, wherein a groove is disposed circumferentially in a front surface of the second gas leak inhibiting ring so that when it reveives a gas pressure, an inner diameter of the ring is reduced and an outer diameter of the ring is increased easily.

8. A gas generator ignited by a striker comprising:
a gunpowder holder for retaining a gunpowder,
a striker holding member disposed in front of the gunpowder holder and having a striker guide aperture,
a striker situated in the striker guide aperture of the striker holding member to dash against the gunpowder in the gunpowder holder,
a spring for resiliently biasing said striker toward the gunpowder,
means for detachably engaging the striker for retaining said striker against biasing force of the spring, said striker engaging means, when receiving a predetermined force, releasing the striker to allow the striker to dash toward the gunpowder by the spring, and
means for preventing leakage of a gas through said striker guide aperture when the gas is generated.

9. A gas generator as defined in claim 8, wherein said gas leak preventing means includes a tapered portion of the striker guide aperture arranged so that a diameter enlarges toward the gunpowder holder, and a gas leak inhibiting ring disposed in the striker guide aperture, said gas leak inhibiting ring, when the gas is ejected, being urged toward the tapered portion to tightly seal around the striker.

* * * * *